(12) United States Patent
Chiodo

(10) Patent No.: US 6,513,259 B1
(45) Date of Patent: Feb. 4, 2003

(54) SLIDE ASSEMBLY WITH ADJUSTABLE SLIDING RESISTANCE

(76) Inventor: Chris D. Chiodo, 29277 Newport, Warren, MI (US) 48093

( * ) Notice: Subject to any disclaimer, the term of this patent is extended or adjusted under 35 U.S.C. 154(b) by 17 days.

(21) Appl. No.: 09/710,632

(22) Filed: Nov. 9, 2000

(51) Int. Cl.[7] .......................... F16C 29/00; B23Q 16/08
(52) U.S. Cl. .......................... 33/568; 33/573; 33/296; 33/809; 33/1 M; 348/40; 348/42
(58) Field of Search .......................... 33/613, 626, 628, 33/573, 568, 632, 1 M, 290, 293, 296, 809; 403/289, 290, 381, 373, 374.2, 374.3, 362; 248/419, 421, 429; 384/40, 42; 312/334.16, 334.36

(56) References Cited

U.S. PATENT DOCUMENTS

| | | | |
|---|---|---|---|
| 3,810,311 A | * 5/1974 | Pingel | 33/180 R |
| 4,614,043 A | * 9/1986 | Nagano et al. | 33/529 |
| 4,941,758 A | * 7/1990 | Osawa | 384/40 |
| 5,105,552 A | * 4/1992 | Bielle | 33/573 |
| 5,289,814 A | * 3/1994 | Maisano | 33/265 |
| 5,299,609 A | * 4/1994 | Wedler | 33/613 |
| 5,400,523 A | * 3/1995 | Hatheway | 33/828 |
| 5,465,492 A | * 11/1995 | Bond | 33/275 R |
| 6,347,460 B1 | * 2/2002 | Forrer et al. | 33/626 |

* cited by examiner

*Primary Examiner*—Diego Gutierrez
*Assistant Examiner*—Travis Reis
(74) *Attorney, Agent, or Firm*—Lawrence J. Shurupoff

(57) ABSTRACT

A slide is mounted on a slideway with a pair of tongue and groove interconnections. The slideway has a pair of engagement rails or tongues provided on a pair of cantilevered arms. The rails are spring biased within a pair of grooves formed in the slideway. An adjustment screw drives the arms apart to adjustably spring bias the rails into the grooves.

20 Claims, 4 Drawing Sheets

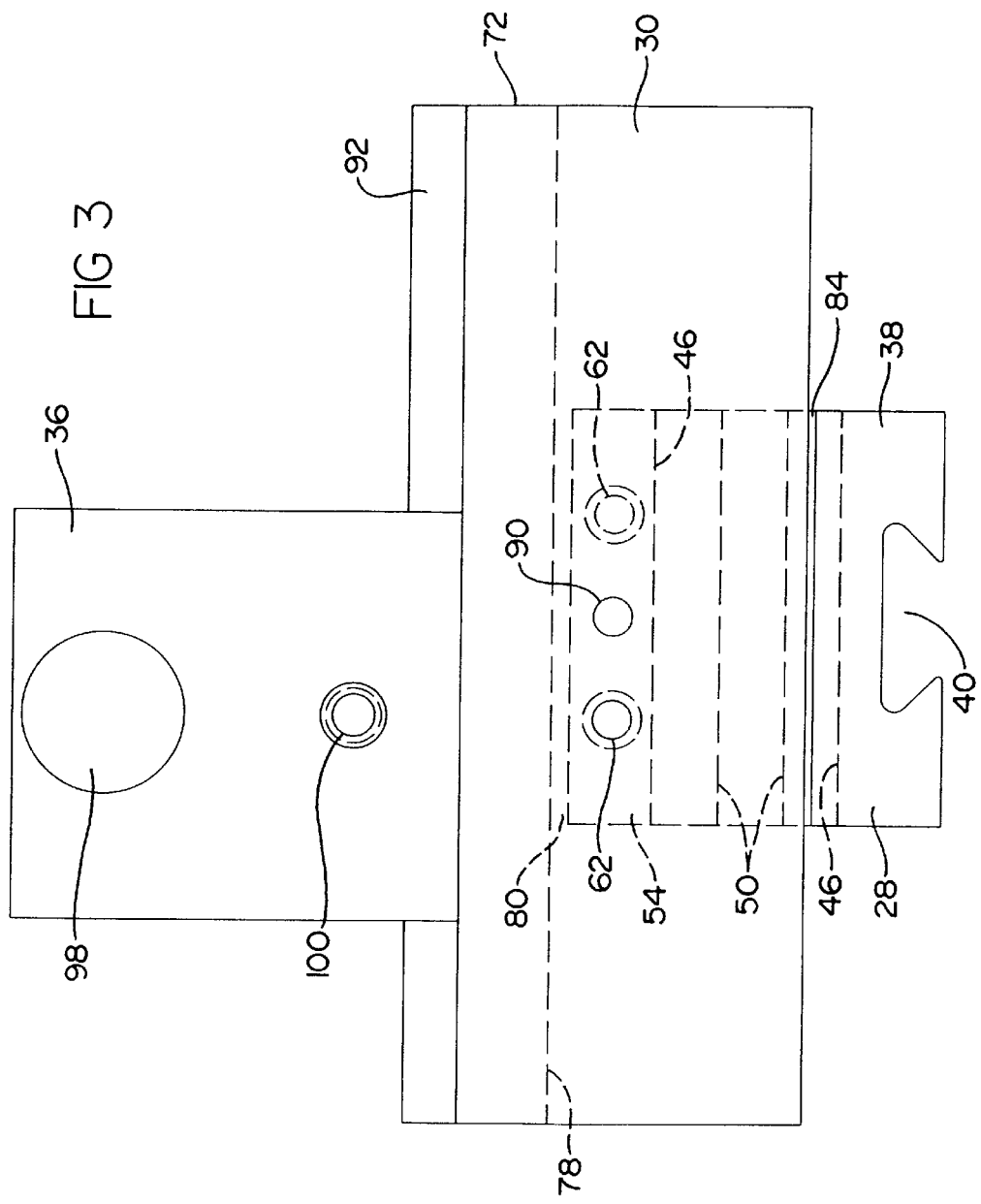

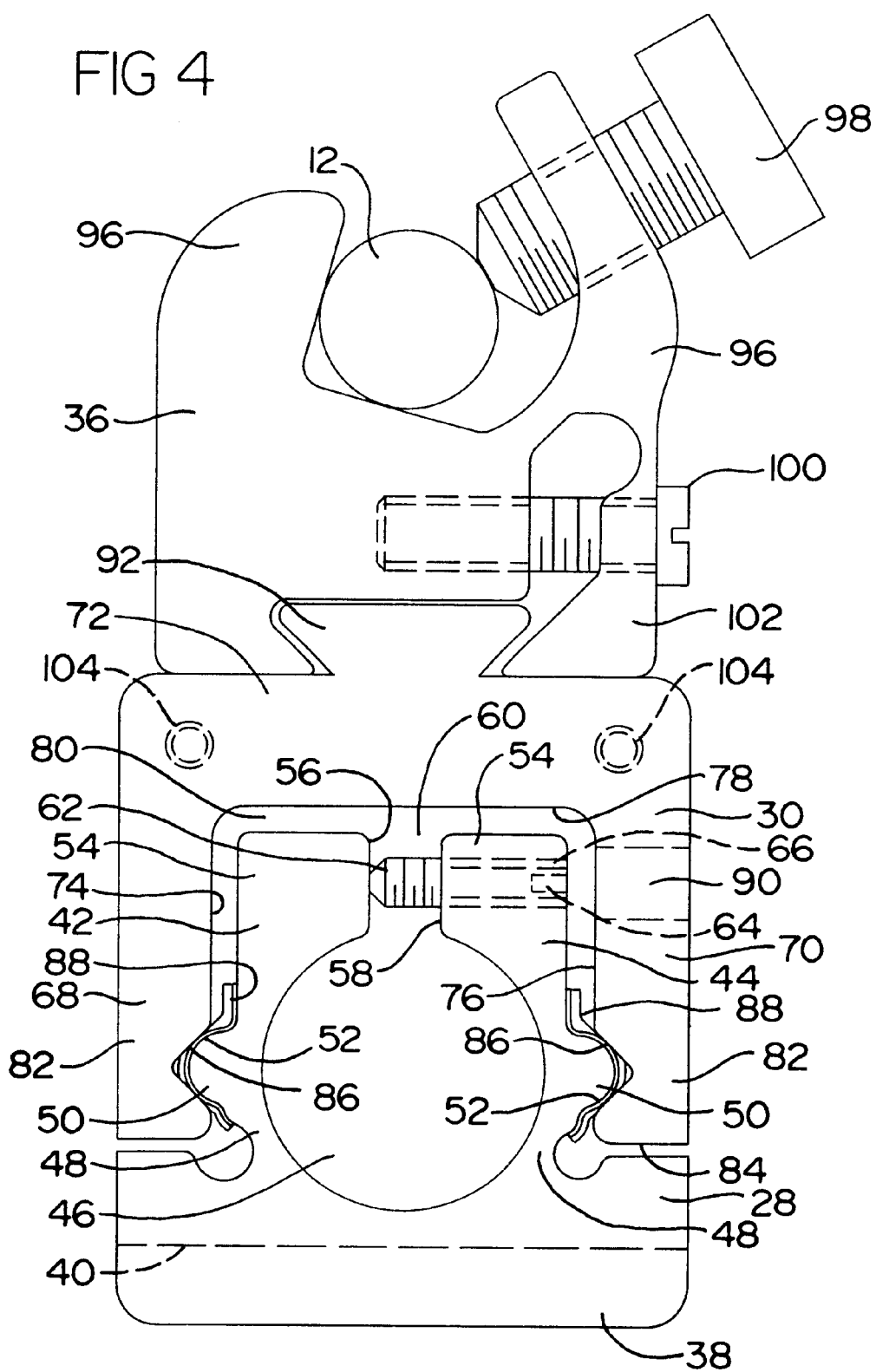

SLIDE ASSEMBLY WITH ADJUSTABLE SLIDING RESISTANCE

BACKGROUND OF THE INVENTION

1. Field of the Invention

The present invention relates in general to mechanical slides and slideways and relates in particular to such apparatus having an adjustable sliding resistance to provide a high quality feel as an operator manually drives the slide along the slideway.

2. Description of Prior Developments

Precision positioning instruments such as micromanipulators and stereotaxic devices are used to conduct laboratory procedures on test specimens such as laboratory animals, eg, rats and mice. Hypodermic needles, electrodes, probes and other tools are carefully applied to a test specimen by an operator such as described in co-pending patent application titled "Manual Drive for Positioning Precision instruments" having serial number 09/707,051, filed on Nov. 6, 2000 by the present inventor and incorporated herein by reference.

In order to provide a high quality precision sliding movement between a slide on which a precision laboratory tool is mounted, and a slideway mounted on the positioning instrument, prior designs have used ball bearings and linear bearings to support the slide on the slideway. Although these bearings achieve the desired result, they significantly increase the cost and complexity of the slide assembly.

Some positioning instruments use dovetail connections between a slide and slideway. However, such connections typically require periodic lubrication with oil or grease to overcome the inherent high friction associated with dovetail slides.

Accordingly, a need exists for a high quality, precision slide and slideway assembly which has a relatively simple construction and is economical to produce.

A further need exists for such a slide and slideway assembly which avoids the use of expensive ball bearings and linear bearings.

Yet a further need exists for such an assembly which avoids the use of dovetail joints and eliminates the need for lubrication with oil or grease.

Still a further need exists for an inexpensive precision slide and slideway assembly which produces a smooth precision feel or "tight" feel to an operator as the operator manually drives the slide over the slideway.

Still a further need exists for such an assembly which can be easily adjusted to select the amount of friction and play between the slide and slideway so as to optimize the "feel" of the slide assembly as perceived by an operator.

SUMMARY OF THE INVENTION

The present invention has been developed to fulfill the needs noted above and therefore has as an object the provision of an economical slide and slideway assembly that has a simple construction yet which has a tight precision feel to an operator during operation of the assembly.

A further object of the invention is the provision of a slide and slideway assembly which does not require periodic lubrication with oil or grease.

Another object of the invention is the provision of a precision slide and slideway assembly which does not require the use of ball bearings such as linear ball bearings and which avoids the use of dovetail interconnections.

Yet another object of the invention is the provision of a precision slide and slideway assembly which has an adjustable sliding friction fit between the slide and slideway to optimize the feel perceived by an operator of the slide as it moves over the slideway. A smooth but tight or play-free interfit can be achieved with such an adjustment.

These and other objects are met in accordance with the present invention which is directed to a precision slide and slideway assembly having a simple construction which obviates the need for ball bearings such as linear ball bearings, and avoids the use of oil or grease lubricated dovetail interconnections. The amount of sliding friction produced between the slide and slideway can be adjusted, selected and controlled by a simple adjustment which biases a tongue against a groove of a tongue and groove interconnection between the slide and slideway.

The tongue is mounted or formed on a cantilevered spring arm which can be flexed toward and away from the groove. The greater the elastic deformation and flexure of the free end of the spring arm toward the groove, the greater is the sliding friction produced between the tongue and groove, and vice versa.

A strip of ultra high molecular weight plastic tape can be positioned between the tongue and groove to reduce sliding friction and produce a smooth, "silky" yet tight precision feel when an operator manually turns the drive knobs which drive the slide over the slideway. Although the slide and slideway assembly has a minimum of parts and is economical to manufacture, it has the tight precision fit, feel and stability of similar systems costing much more due to their increased complexity.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 3 is a side elevation view of a slide and slideway of the type shown in FIGS. 1 and 2, with the end plates removed; and FIG. 4 is left axial end view of the slide and slideway of FIG. 3.

In the various views of the drawings, like reference characters designate like or similar parts.

DETAILED DESCRIPTION OF THE PREFERRED EMBODIMENTS

Figure 1:
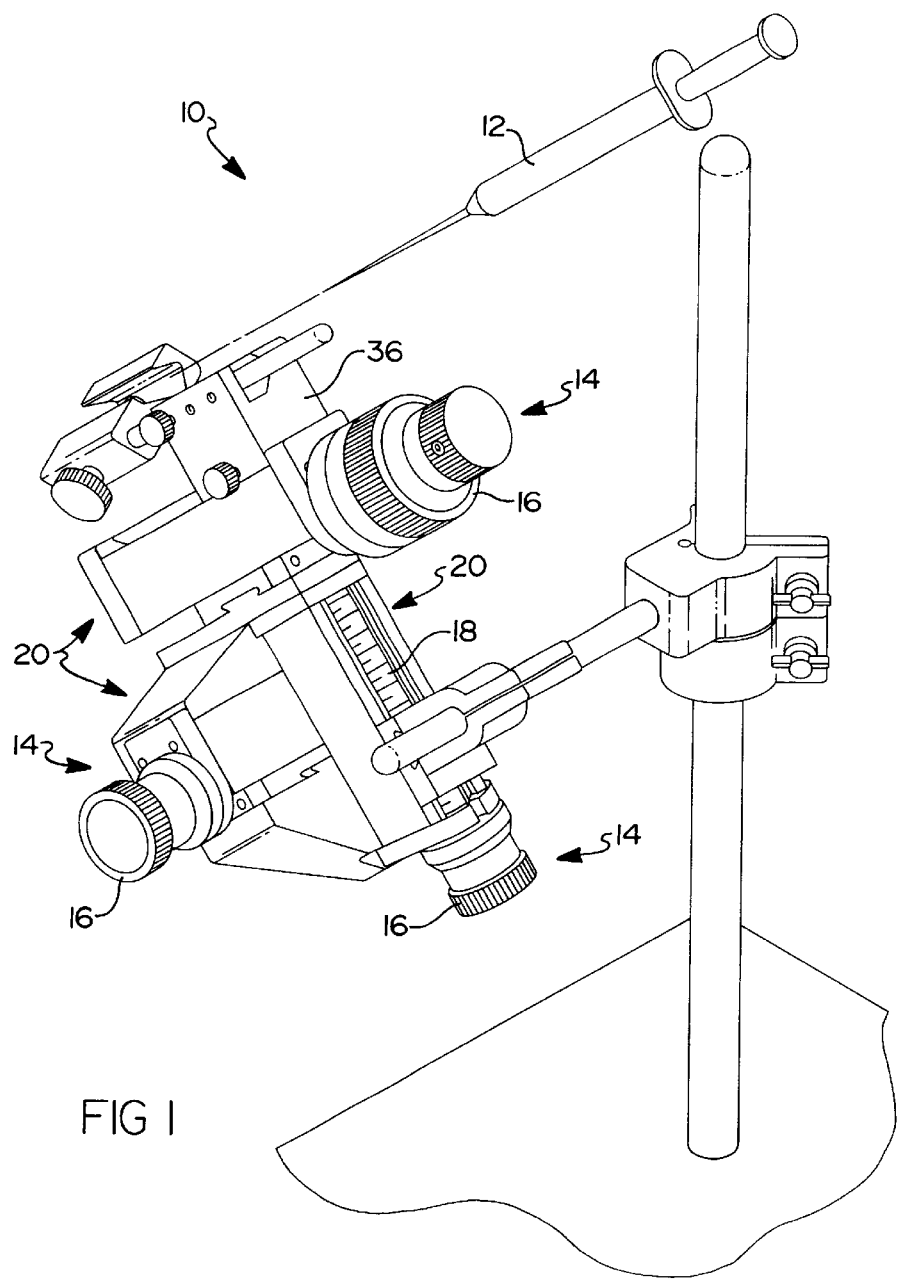
FIG. 1 is a perspective view of a precision positioning instrument provided with a slide and slideway assembly constructed in accordance with the invention.

The present invention will now be described in conjunction with the drawings, beginning with FIG. 1 which shows a precision positioning system 10 of the type used to accurately position a tool or instrument 12 with respect to a laboratory specimen such as a laboratory animal. System 10 is referred to as a micromanipulator, however, the invention described below can be used with virtually any apparatus or system which employs precision positioning assemblies such as stereotaxic systems and precision machine tools as well as robotic end effectors.

The system 10, as shown, includes three manual drive systems 14 aligned along three mutually orthogonal axes. Each drive system 14 has one or more rotary knobs 16 for manually driving a respective lead screw 18. When a lead screw 18 rotates, it drives a slide assembly 20 in the manner described in detail in copending application Ser. No. 09/707, 051, noted above. It can be appreciated that fine precision positioning of tool 12 is possible by appropriate rotation of one or more of the rotary knobs 16.

Figure 2:
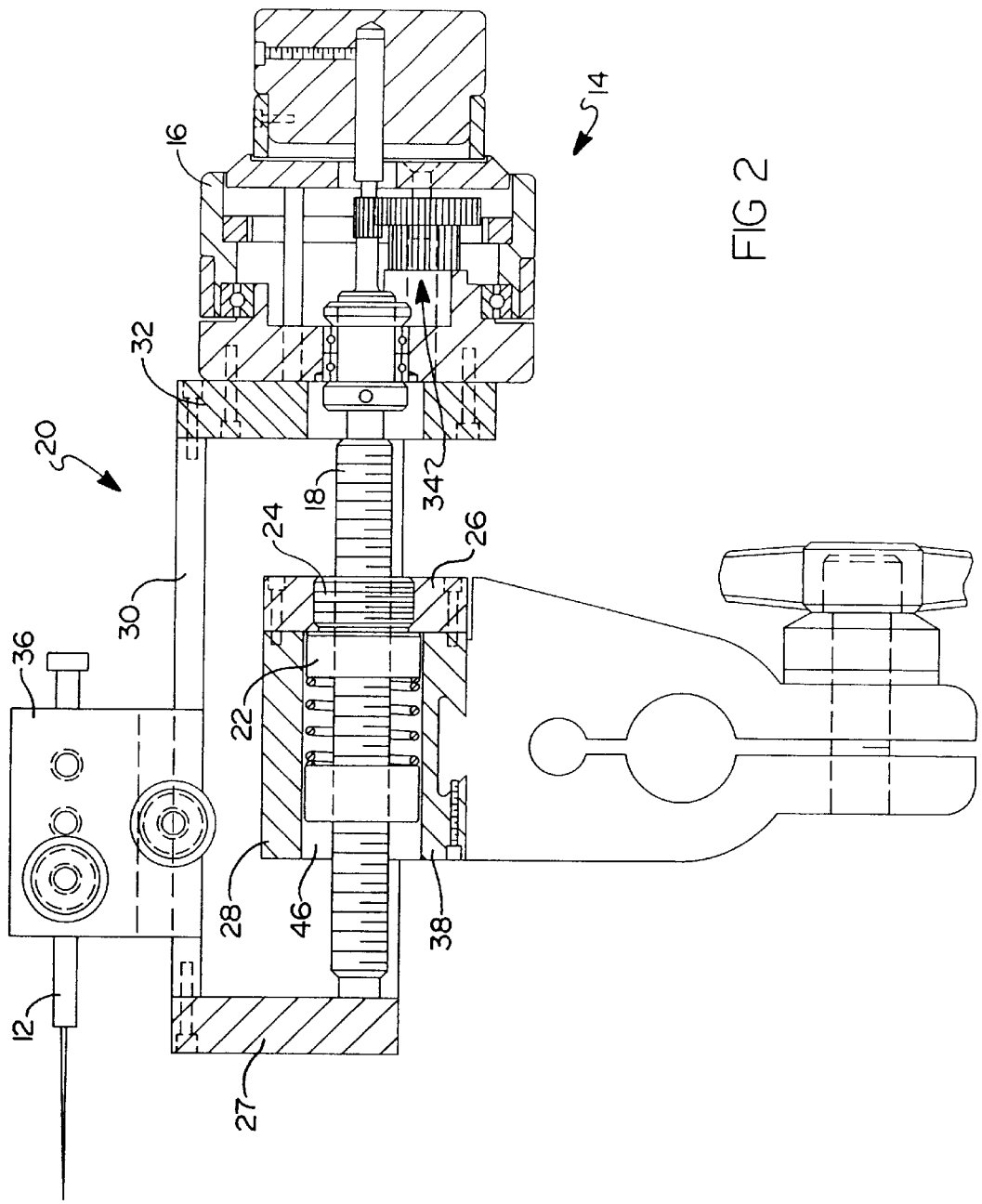
FIG. 2 is a side elevation view, partly in section, of a slide and slideway of the type shown in FIG. 1.

Details of one of the drive systems 14 and slide assemblies 20 of FIG. 1 are shown in FIG. 2. Lead screw 18 is threaded within a drive nut 22. The dive nut 22 has an externally threaded end 24 anchored within a threaded bore formed through an end plate 26. End plate 26 is fixed to one end of a slideway 28.

Slideway 28 supports and guides a slide 30 as discussed further below. The slide 30 is fixed to the drive system 14 via support plate 32. When knob 16 is manually turned by an operator, lead screw 18 is rotated via gear train 34. As the lead screw rotates within drive nut 22, slide 30 is driven along slideway 28.

The invention is particularly directed to the sliding connection provided between slideway 28 and the slide 30. Details of this economical precision connection are shown in FIGS. 3 and 4 wherein all end plates 26, 27 and support plate 32 have been removed for purposes of clarity. An instrument holder or tool clamp 36 has been retained in FIGS. 3 and 4 for purposes of illustration.

Slideway 28 includes a rigid base portion 38 which may have a mounting such as a dovetail slot 40 for mounting the slideway 28 on a positioning apparatus or positioning system, such as system 10. A first cantilevered arm 42 extends outwardly from one side portion of base portion 38 and a second cantilevered arm 44 extends outwardly from an opposite side portion of base portion 38.

The first and second arms 42, 44 define an opening, channel or groove 46 between them. The channel or groove 46 may have any suitable shape, but a generally cylindrical channel is preferred for ease of fabrication. While channel 46 allows for the necessary flexure of the arms 42, 44, it also provides the necessary clearance for lead screw 18 which passes centrally through channel 46.

Each arm 42, 44 is connected to the base portion 38 by a thin sectioned region or necked down flexure portion 48 about which each arm resiliently flexes. Each flexure portion 48 transitions into an axially extending rail, tongue or engagement member 50. An engagement member 50 projects laterally from each arm 42, 44 to engage a complementary groove on the slide 30.

As shown in FIG. 4, each engagement member 50 is formed with an arcuate outer sliding surface 52 which preferably extends over an arc of greater than 90 degrees. A substantially semicircular profile on sliding surface 52 has been found to function well in practice. Each arm 42, 44 has a free end portion 54. The free end portions 54 have opposing end faces 56, 58 which between them define a variable width open mouth or slot 60. Slot 60 defines an entrance to channel 46.

An adjustment member, such as an allen screw 62 having a blind socket 64, is threaded through a threaded bore 66 formed through the free end portion 54 of arm 44. Screw 62 extends through end face 58 and between the opposed free end portions 54. Screw 62 spans across slot 60 to engage the opposite end face 56. By turning screw 62 inward against end face 56, the arms 42, 44 are spread laterally apart so as to selectively increase the size of slot 60. By turning screw 62 outward away from end face 56, the arms 42, 44 are relaxed and return to their unstressed free position at which slot 60 is at its minimum width.

Slide 30 embraces and substantially encloses the arms 42,44 on the slideway 28 with a pair of side walls 68, 70 which extend outwardly from a base portion 72. The inner surfaces 74, 76 of side walls 68, 70 and the inner surface 78 of base portion 72 define a somewhat saddle shaped opening having a generally U-shaped channel. A gap or clearance 80 is maintained between the slideway 28 and the slide 30 except at selected points of contact.

Each side wall 68, 70 has a free end portion 82 located adjacent the base portion 38 of the slideway 28 and spaced apart from the base portion 38 by a gap 84. An axial or longitudinally extending V-shaped or U-shaped notch or groove 86 is formed on the inner surfaces 74, 76 of the side walls 68, 70 at their free end portions 82.

The engagement members 50 are dimensioned to fit within grooves 86 with a spring biased sliding fit. To reduce the sliding friction, a strip of ultra high molecular weight plastic tape 88 is adhesively applied over the outer surface 52 of each engagement member 50.

The amount of sliding resistance between the slideway 28 and the slide 30 can be adjusted and set for a smooth yet "tight" feel by adjusting the pressure applied by the engagement members 50 against the grooves 86. This pressure can be increased by screwing the adjustment screw 62 inwardly to open slot 60 and press the engagement members 50 within and against the grooves 86.

A simple hand tool such as an allen wrench can be inserted through a clearance hole 90 formed in side wall 70, with hole 90 aligned over the screw 62. As seen in FIG. 3, two longitudinally spaced screws 62 are symmetrically spaced on arm 44 to apply pressure evenly along the sliding interconnection between engagement members 50 and grooves 86. When screws 62 are tightened or driven inwardly, they increase the sliding resistance between the slide and slideway, and when they are loosened or withdrawn outwardly, the screws 62 reduce the sliding resistance.

When screws 62 are tightened, the flexure portions 48 on the arms 42, 44 flex inwardly toward the channel 46 and provide a spring-biased force which forces the engagement members 50 against grooves 86. The symmetrical arrangement of the walls 68, 70 around the arms 42, 44 provides for the application of substantially the same sliding resistance along each tongue and groove interconnection formed between the engagement members 50 and the grooves 86.

A particular advantage of the configuration of the V or U-shaped grooves 86 and the mating arcuate surfaced rails or engagement members 50 is the creation of a self-centering interconnection. As each screw 62 is tightened, the arcuate engagement members 50 tend to align themselves symmetrically within grooves 86 to equalize the force applied against each groove and thereby enhance the smooth sliding fit between the tongue and groove interconnection. Each arcuate surface 52 tends to make a pair of single line contacts along each pair of beveled faces of each groove so as to provide a total of four lines of contact along the two tongue and groove interconnections.

A mounting such as dovetail 92 can be provided on the base 72 of the slide 30 for mating with a dovetail groove formed in a tool or instrument carrier such as tool clamp 36. A tool 12, or other instrument can be clamped within the jaws 96 of the clamp 36 with a set screw 98. Another set screw 100 can be used to lock the tool clamp 36 on the dovetail 91. Screw 100 selectively clamps spring leg 102 against the lower edge of dovetail 92. Tapped bores 104 can be formed in the slide 30 for attachment of an end plate, if desired.

All of the parts of the slide 30 and slideway 28 may be formed of plastic or a metal material such as aluminum alloy or zinc alloy. The simple shape of the slide and slideway allows for the use of conventional manufacturing techniques.

There has been disclosed heretofore the best embodiment of the invention presently contemplated. However, it is to be understood that the various changes and modifications may be made thereto without departing from the spirit of the invention.

What is claimed is:

1. A slide assembly, comprising:

a slideway;

a pair of arms provided on said slideway;

a slide mounted on said slideway;

a pair of side walls provided on said slide;

a sliding interconnection provided between said slide and said slideway; and an adjustment member extending between said pair of arms and respectively biasing said pair of arms in opposite and apart directions, against said pair of side walls.

2. The assembly of claim 1, wherein said adjustment member comprises a screw.

3. The assembly of claim 1, wherein said sliding interconnection comprises a tongue and groove interconnection.

4. The assembly of claim 1, wherein each of said arms comprises an engagement member and each of said side walls comprises a groove, and wherein said sliding interconnection is formed between each said engagement member and each said groove.

5. The assembly of claim 4, wherein each said engagement member comprises an arcuate engagement surface and each said groove comprises a substantially V-shaped groove.

6. The assembly of claim 1, wherein said sliding interconnection comprises a strip of ultra high molecular weight plastic located between said arms and said side walls.

7. The assembly of claim 1, wherein said pair of side walls extends over and embraces said pair of arms along said sliding interconnection.

8. The assembly of claim 1, wherein each of said arms comprises a necked down flexure portion and wherein adjustment of said adjustment member causes flexure of said pair of arms about said necked down flexure portion.

9. The assembly of claim 1, wherein said pair of arms comprises a pair of free end portions defining a variable width slot therebetween, and wherein said adjustment member extends between and selectively varies the width of said slot.

10. A precision slide assembly for use with positioning instruments, comprising:

a slideway having a base portion and first and second arms extending from said base portion;

a slide having first and second side walls respectively located adjacent to said first and second arms;

first and second sliding interconnections located between said first and second arms and said first and second side walls; and at least one adjustment member mounted on said first arm and adjustable into spring biased contact in opposite and apart directions against said second arm.

11. The assembly of claim 10, wherein said adjustment member comprises a threaded member.

12. The assembly of claim 10, wherein said first arm has a flexible section located adjacent said base, a free end portion cantilevered from said base and an engagement member located between said flexible section and said free end portion such that said engagement member is spring biased against said first wall to form said first sliding interconnection.

13. The assembly of claim 12, further comprising a strip of low friction plastic material provided between said engagement member and said first wall.

14. The assembly of claim 10, wherein said at least one adjustment member comprises a pair of spaced apart screws.

15. The assembly of claim 10, further comprising a substantially cylindrical channel formed between said first and second arms.

16. The assembly of claim 10, wherein said first and second arms respectively comprise first and second free end portions defining an adjustable width slot therebetween.

17. The assembly of claim 16, wherein said adjustment member comprises a threaded member extending across said slot.

18. The assembly of claim 10, further comprising a dovetail groove formed within said base of said slideway.

19. The assembly of claim 10, further comprising a dovetail provided on said slide.

20. The assembly of claim 10, wherein said first side wall has an opening formed therein for accessing and adjusting said adjustment member.

* * * * *